(12) United States Patent
Yang et al.

(10) Patent No.: US 12,406,674 B2
(45) Date of Patent: Sep. 2, 2025

(54) TEXT PROCESSING METHOD AND APPARATUS, ELECTRONIC DEVICE, AND MEDIUM

(71) Applicant: BEIJING BYTEDANCE NETWORK TECHNOLOGY CO., LTD., Beijing (CN)

(72) Inventors: Jingsheng Yang, Beijing (CN); Chunsai Du, Beijing (CN); Wenming Xu, Beijing (CN); Li Zhao, Beijing (CN); Xiao Han, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 263 days.

(21) Appl. No.: 18/043,514

(22) PCT Filed: Aug. 24, 2021

(86) PCT No.: PCT/CN2021/114184
§ 371 (c)(1),
(2) Date: Feb. 28, 2023

(87) PCT Pub. No.: WO2022/042512
PCT Pub. Date: Mar. 3, 2022

(65) Prior Publication Data
US 2023/0326466 A1   Oct. 12, 2023

(30) Foreign Application Priority Data
Aug. 31, 2020   (CN) .................. 202010899805.X

(51) Int. Cl.
*G10L 15/22*   (2006.01)
*G10L 17/02*   (2013.01)
(Continued)

(52) U.S. Cl.
CPC .............. *G10L 17/20* (2013.01); *G10L 17/02* (2013.01); *G10L 17/14* (2013.01); *G10L 15/22* (2013.01)

(58) Field of Classification Search
CPC ........................................ G10L 15/22
See application file for complete search history.

(56) References Cited

U.S. PATENT DOCUMENTS

| 9,037,967 B1 * | 5/2015 | Al-Jefri | G06F 40/232 |
| | | | 715/257 |
| 2007/0112926 A1 * | 5/2007 | Brett | G06Q 10/109 |
| | | | 709/206 |

(Continued)

FOREIGN PATENT DOCUMENTS

| CN | 105374356 A | 3/2016 |
| CN | 107679032 A | 2/2018 |

(Continued)

OTHER PUBLICATIONS

International Search Report issued Nov. 23, 2021 in International Patent Application No. PCT/CN2021/114184, with English translation (5 pages).

(Continued)

*Primary Examiner* — Feng-Tzer Tzeng

(57) ABSTRACT

Provided are a text processing method and apparatus, an electronic device, and a medium. The method includes the following: target text information generated based on audio information is acquired; a to-be-error-corrected word in the target text information and a target candidate replacement word corresponding to the to-be-error-corrected word are determined; and a target replacement word corresponding to the to-be-error-corrected word is determined according to (Continued)

the target candidate replacement word, and the target text information is updated based on the target replacement word.

19 Claims, 3 Drawing Sheets

(51) Int. Cl.
*G10L 17/14* (2013.01)
*G10L 17/20* (2013.01)

(56) References Cited

U.S. PATENT DOCUMENTS

| | | | |
|---|---|---|---|
| 2008/0243514 A1* | 10/2008 | Gopinath | G10L 15/22 704/E15.04 |
| 2014/0214401 A1 | 7/2014 | Li et al. | |
| 2018/0197548 A1* | 7/2018 | Palakodety | G10L 17/06 |

FOREIGN PATENT DOCUMENTS

| | | |
|---|---|---|
| CN | 110210029 A | 9/2019 |
| CN | 110276077 A | 9/2019 |
| CN | 110457688 A | 11/2019 |
| CN | 111241814 A | 6/2020 |
| CN | 111274785 A | 6/2020 |
| CN | 112115706 A | 12/2020 |

OTHER PUBLICATIONS

First Office Action issued Jul. 12, 2021 in Chinese Patent Application No. 202010899805.X, with English translation (19 pages).
Second Office Action issued Nov. 18, 2021 in Chinese Patent Application No. 202010899805.X, with English translation (19 pages).
Written Opinion for International Application No. PCT/CN2021/114184, mailed Nov. 23, 2021, 9 Pages.

* cited by examiner

TEXT PROCESSING METHOD AND APPARATUS, ELECTRONIC DEVICE, AND MEDIUM

CROSS-REFERENCE TO RELATED APPLICATIONS

This is a National Stage Application filed under 35 U.S.C. 371 based on International Patent Application No. PCT/CN2021/114184, filed on Aug. 24, 2021, which claims priority to Chinese patent application Ser. No. 202010899805.X filed on Aug. 31, 2020, disclosures of both of which are incorporated herein by reference in their entireties..

TECHNICAL FIELD

Embodiments of the present disclosure relate to the field of computer technology, for example, a text processing method and apparatus, an electronic device, and a medium.

BACKGROUND

At present, the technology of automatic speech recognition (ASR) has been increasingly applied in scenes such as public life, work, and study. In order to perform speech recognition, it is usually necessary to recognize a part including a speech from an audio stream first. It is to be understood that, if the quality of the audio stream is relatively poor (for example, the signal-to-noise ratio is relatively low), the process of recognizing the speech from the audio stream may suffer a relatively great interference, thereby possibly resulting in a deviation of an ASR result.

SUMMARY

The present disclosure provides a text processing method and apparatus, an electronic device, and a medium.

In a first aspect, the present disclosure provides a text processing method. The method includes the steps below.

Target text information generated based on audio information is acquired.

A to-be-error-corrected word in the target text information and a target candidate replacement word corresponding to the to-be-error-corrected word are determined.

A target replacement word corresponding to the to-be-error-corrected word is determined according to the target candidate replacement word, and the target text information is updated based on the target replacement word.

In a second aspect, the present disclosure further provides a text processing apparatus. The apparatus includes a text information determination module, a replacement word determination module, and a text information updating module.

The text information determination module is configured to acquire target text information generated based on audio information.

The replacement word determination module is configured to determine a to-be-error-corrected word in the target text information and a target candidate replacement word corresponding to the to-be-error-corrected word.

The text information updating module is configured to determine, according to the target candidate replacement word, a target replacement word corresponding to the to-be-error-corrected word and update the target text information based on the target replacement word.

In a third aspect, the present disclosure further provides an electronic device. The electronic device includes at least one processor and a storage apparatus configured to store at least one program.

When executed by the at least one processor, the at least one program causes the at least one processor to perform the text processing method according to any embodiment of the present disclosure In a fourth aspect, the present disclosure further provides a non-transitory storage medium including computer-executable instructions. When the computer-executable instructions are executed by a computer processor, the text processing method according to the first aspect of the present disclosure is performed.

DETAILED DESCRIPTION

Embodiments of the present disclosure are described in more detail hereinafter with reference to the drawings.

It should be understood that the various steps recited in the method embodiments of the present disclosure may be performed in a different order, and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" in the present disclosure are intended to be illustrative and not limiting, and that those skilled in the art should understand that "at least one" is intended unless the context clearly indicates otherwise.

Embodiment One

Figure 1:
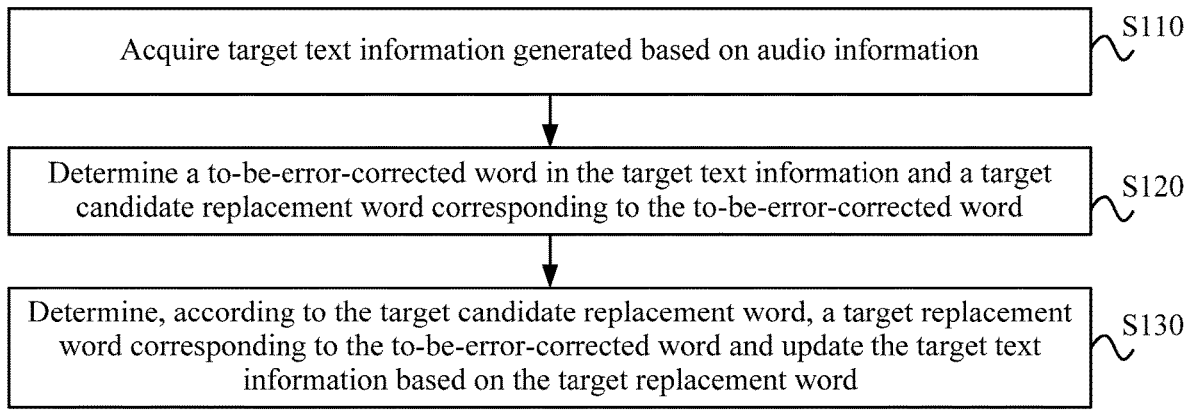
FIG. 1 is a flowchart of a text processing method according to embodiment one of the present disclosure.

FIG. 1 is a flowchart of a text processing method according to embodiment one of the present disclosure. Embodiments of the present disclosure are applicable to the case where error correction is performed for text generated based on audio information to determine a wrong word in the text and a correct word corresponding to the wrong word and where the text is updated dynamically based on the correct word. Of course, these embodiments may also be applicable to the case where error correction needs to be performed for the text, for example, the case of determining a wrong word from the text. The method may be performed by a text processing apparatus which may be implemented in the form of software and/or hardware. Optionally, the text processing apparatus may be implemented by an electronic device which may be, for example, a mobile terminal, a personal computer (PC) terminal, or a server.

As shown in FIG. 1, the method includes the steps below.

In S110, target text information generated based on audio information is acquired.

Technical solutions of embodiments of the present disclosure may be applied to a real-time interactive scene, such as a video conference and a live broadcast. A real-time interactive interface is any interactive interface in a real-time interactive application scene. The real-time interactive application scene may be implemented by means of the Internet and a computer, for example, an interactive application program implemented through a native program, a web program, or the like. In the real-time interactive interface, a plurality of interactive users are allowed to interact with each other through interactive behaviors in various forms, for example, inputting text, inputting a speech, inputting a video, or sharing a content object. Alternatively, the technical solutions may also be applied to a non-real-time interactive scene. Optionally, subtitle information generated based on audio information in a screen-recording video is acquired and taken as text information.

Of course, technical solutions of this embodiment may also be applied to any scene where text needs to be error-corrected.

In an interaction based on a real-time interactive interface, the audio information of a speaker may be collected and converted to corresponding text information. In the process of practical application, the case of relatively low audio quality exists. For example, the speaker cannot articulate clearly, or the speech content of the speaker includes information such as an English word or a technical term. When the conversion to the corresponding text is performed only based on the audio information, a big discrepancy exists between the text acquired through conversion and the audio information. That is, the text obtained through the conversion does not match the audio information. Alternatively, many errors exist in the text, resulting in the problem that other users cannot know the speech content of the speaker in time and thus the efficiency of interaction is reduced. To solve this problem, after the text is generated based on the audio information, the text may be error-corrected, thereby improving the correspondence between the text information and the audio information and thus achieving the effect of facilitating user reading.

The target text information may be text information that is without error correction within a preset duration and is determined from the text generated based on the audio information of at least one speaker. Alternatively, once the audio information is detected, the text corresponding to the audio information is generated and taken as the target text information.

That is, the target text information may be acquired from a speech-to-text module or may be acquired from the text displayed on a client and without error correction.

In S120, a to-be-error-corrected word in the target text information and a target candidate replacement word corresponding to the to-be-error-corrected word are determined.

The target text information is acquired by converting the audio information. When the audio quality of the audio information is relatively poor, some errors exist in the text information acquired based on the conversion of the audio information. In order to make the final text information more fit the content of the audio information, the target text information may be error-corrected. For example, a word that is wrong or needs to be replaced in the text information is determined as the to-be-error-corrected word. That is, a wrong word in the target text information and/or a word with a high possibility of being wrong in the target text information is taken as the to-be-error-corrected word first. Then a replacement word, that is, a correct word, corresponding to the to-be-error-corrected word needs to be determined. In some application scenes, a plurality of replacement words corresponding to the to-be-error-corrected word may exist. In these application scenes, the replacement words may be taken as target candidate replacement words so that a word with the highest matching degree against the to-be-error-corrected word is determined from the target candidate replacement words and is taken as a target replacement word.

Exemplarily, the to-be-error-corrected word in the target text information and the target candidate replacement words corresponding to the to-be-error-corrected word are determined by detecting the text content in the target text information so that the target replacement word corresponding to the to-be-error-corrected word is screened out from the target candidate replacement words. Further, the target replacement word is updated in a corresponding position in the target text information, thereby implementing the technical effect of dynamically updating the target text information.

In S130, the target replacement word corresponding to the to-be-error-corrected word is determined according to the target candidate replacement word, and the target text information updated based on the target replacement word.

In order to improve the accuracy of determining the target replacement word, a certain number of target candidate replacement words may be determined first. A target candidate replacement word is a word whose matching degree against the to-be-error-corrected word is higher than a certain threshold. The target replacement word is a replacement word having the highest correspondence with the target text information and obtained by processing the target candidate replacement words. That is, the target replacement word refers to a word having the highest correspondence with the target text information and screened out from all the target candidate replacement words. The to-be-error-corrected word in the target text information may be updated based on the target replacement word, thereby implementing the technical effect of updating the target text information.

According to technical solutions of embodiments of the present disclosure, target text information generated based on audio information is acquired; a to-be-error-corrected word in the target text information and a target candidate replacement word corresponding to the to-be-error-corrected word are determined; a target replacement word corresponding to the to-be-error-corrected word is determined according to the target candidate replacement word, and the target text information is updated based on the target replacement word. This arrangement solves the following technical problem in the related art: A great number of errors may exist in the text generated based on audio information, not facilitating user reading, thus resulting in poor user experience, and greatly reducing the efficiency of interaction. With this arrangement, when the text is generated based on audio information, a wrong word in the text and a corresponding replacement word are acquired and updated in the text so that the error rate in the acquired text is reduced greatly, thereby improving user experience and the efficiency of interaction.

In this embodiment, before the target text information generated based on the audio information is acquired, the method further includes the following steps: The audio information of a speaker is collected, and the audio information is converted to corresponding text information; current text content displayed on a client is generated according to the text information, a speech timestamp corresponding to the speaker, and an identifier of the speaker; and the target text information is determined based on the current text content.

That is, in a real-time interactive process, the audio information of each speaker may be collected and converted to corresponding text information. The text content displayed on the client is generated according to the identifier of the speaker, a speech point in time, and the corresponding text information and is sent to the client so as to be displayed in a preset region of the client.

It is to be noted that content displayed in the preset region includes the identifier of the speaker, the speech timestamp, and the corresponding text information. A server may acquire the text information in the preset region to perform error correction, that is, may acquire the target text information from the preset region. Of course, it may also be that text converted from the audio information is stored in a speech-to-text module. Text without error correction within a certain duration may be retrieved from the speech-to-text module so as to be error-corrected.

It is to be understood that when the corresponding text information is displayed in the preset region, text information without error correction within a certain duration may be acquired and error-corrected so as to dynamically update the text corresponding to the audio information, thereby improving the correspondence between the text displayed in the preset region and the audio information and thus implementing the technical effect of improving the efficiency of interaction.

It is to be noted that technical solutions of embodiments of the present disclosure may also be applied to any scene where text needs to be error-corrected.

In this embodiment, the step in which the target text information generated based on the audio information is acquired, the method further includes the following steps: A timestamp of text content without error correction among all text content is determined, the text content without error correction within a preset duration is acquired based on the timestamp, and the target text information is determined based on the text content without error correction.

The server may determine the timestamp of the text content without error correction among all text content displayed in the preset region or among all text content stored in the speech-to-text module. According to the preset duration and the timestamp of the text content without error correction, the text content without error correction within the preset duration is acquired and taken as the target text information. An advantage of processing the text information within the preset duration is that the to-be-error-corrected word in the text information and the corresponding replacement word may be determined in combination with context information, thereby improving the accuracy of determining the to-be-error-corrected word and the replacement word.

Embodiment Two

Figure 2:
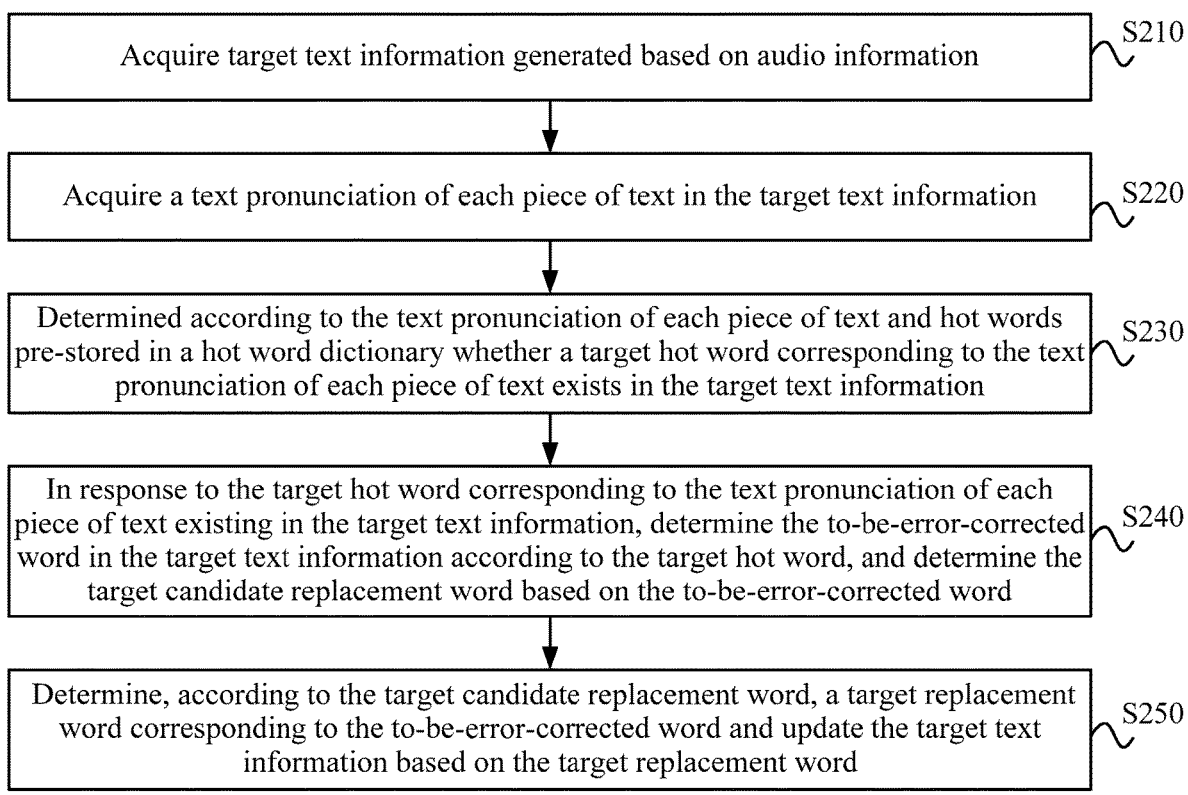
FIG. 2 is a flowchart of a text processing method according to embodiment two of the present disclosure.

FIG. 2 is a flowchart of a text processing method according to embodiment two of the present disclosure. On the basis of the preceding embodiment, the step in which "a to-be-error-corrected word in the target text information and a target candidate replacement word corresponding to the to-be-error-corrected word are determined" may be performed in the following manner: An error correction manner corresponding to an error correction type is adopted to determine the to-be-error-corrected word in the target text information and the target candidate replacement word corresponding to the to-be-error-corrected word so as to determine the target replacement word based on the target candidate replacement word.

The error correction type includes a type of text-pronunciation-based error correction and a type of text-content-based error correction. Different error correction types correspond to different error correction manners. According to technical solutions of embodiments of the present disclosure, two error correction manners may be adopted simultaneously to error-correct text information.

In this embodiment, in order to clearly introduce error correction manners corresponding to different error correction types, the type of text-pronunciation-based error correction may be introduced first. Terms identical to or similar to the preceding embodiment are not repeated here.

As shown in FIG. 2, the method includes the steps below.

In S210, target text information generated based on audio information is acquired.

In S220, a pronunciation of each piece of text in the target text information is acquired.

It is to be noted that in order to improve the efficiency of determining a to-be-error-corrected word and a corresponding target replacement word, it may be determined based on the type of pronunciation-based error correction whether a person's name and a corresponding industry term exist in the target text information. The industry term is determined based on a real-time interactive process and is updated dynamically.

A pronunciation may be the pronunciation of a word. That is, the pronunciation of each piece of text in the target text may be acquired.

Exemplarily, the target text information includes at least one piece of text. The pronunciation corresponding to each piece of text may be determined so as to determine the to-be-error-corrected word in the target text information based on the pronunciation corresponding to each piece of text.

Optionally, the type of text-pronunciation-based error correction includes a type of pinyin-based error correction.

That is, if the text information is in Chinese, pinyin corresponding to each Chinese character may be determined. The to-be-error-corrected word in the target text information is determined based on the pinyin of each Chinese character. If the text information is in English, the to-be-error-corrected word in the target text information may be determined based on the pronunciation of each word.

In S230, it is determined according to the pronunciation of each piece of text and hot words pre-stored in a hot word dictionary whether a target hot word corresponding to the pronunciation of each piece of text exists in the target text information.

It is to be noted that in the process of a video conference or live broadcast, the audio information of each speaker and the content in a shared document or screen may be collected. Based on the content in the document or screen and the audio information, information such as an industry term in the real-time interactive process can be determined. Such a word may be taken as a hot word and stored in the hot word dictionary. That is, before the video conference starts, no hot word exists in a hot word dictionary corresponding to the video conference. A hot word may be determined in the process of the video conference and stored in the hot word dictionary so as to determine the to-be-error-corrected word in the target text information and the corresponding target replacement word based on the hot word stored in the hot word dictionary.

Exemplarily, based on the text pinyin of each piece of text in the target text information, it may be determined whether a hot word corresponding to the text pinyin exists in the hot word dictionary so that the to-be-error-corrected word in the target text information and the corresponding target replacement word are determined.

In S240, in response to the target hot word corresponding to the pronunciation of each piece of text existing in the target text information, the to-be-error-corrected word in the target text information is determined according to the target hot word, and the target candidate replacement word is determined based on the to-be-error-corrected word.

The target candidate replacement word refers to a word corresponding to the to-be-error-corrected word and determined from the hot word dictionary. For example, a Chinese word corresponding to pinyin "modeng" is included in the hot word dictionary. If "modeng" is matched based on text pinyin in the target text information, the Chinese word corresponding to pinyin "modeng" and in the target text information may be taken as the to-be-error-corrected word. Correspondingly, "modern" in the hot word dictionary is the target candidate replacement word. For example, "chord" is included in the hot word dictionary. If "cord" with the same pronunciation as "chord" is matched based on a plurality of pronunciations in the target text information, a word pronounced as cord and in the target text information is taken as the to-be-error-corrected word.

In S250, the target replacement word corresponding to the to-be-error-corrected word is determined according to the target candidate replacement word, and the target text information is updated based on the target replacement word.

In this embodiment, the step in which the target replacement word corresponding to the to-be-error-corrected word is determined according to the target candidate replacement word may be as follows: A first to-be-processed sentence to which the to-be-error-corrected word belongs in the target text information is acquired, and the first to-be-processed sentence is updated based on the target candidate replacement word to acquire a second to-be-processed sentence; a perplexity value of the second to-be-processed sentence is determined; when the perplexity value is greater than or equal to a preset perplexity threshold, the target replacement word is determined according to the to-be-error-corrected word; and when the perplexity value is less than the preset perplexity threshold, the target replacement word is determined according to the target candidate replacement word.

A sentence to which each to-be-error-corrected word belongs is taken as a first to-be-processed sentence. In order to determine whether the to-be-error-corrected word can be replaced with the target candidate replacement word, the to-be-error-corrected word may be replaced with the corresponding target candidate replacement word to acquire the second to-be-processed sentence corresponding to the first to-be-processed sentence. The perplexity value is used for representing the smoothness of the sentence. The determination of the perplexity value of the second to-be-processed sentence is to determine whether the meaning of the second to-be-processed sentence is correct and whether the sentence is smooth. The preset perplexity threshold may be preset according to experience. Optionally, the preset perplexity threshold may be 0.8.

Exemplarily, after the to-be-error-corrected word and the corresponding target candidate replacement word are determined, the sentence to which the to-be-error-corrected word belongs may be determined, and the target candidate replacement word is updated in the sentence. The perplexity value of the updated sentence, that is, the smoothness of the updated sentence, is determined. When the perplexity value is greater than or equal to the preset perplexity threshold, it indicates that the meaning of the sentence updated based on the target candidate replacement word is relatively greatly different from the meaning corresponding to the original speaker. In this case, it indicates that the to-be-error-corrected word is not a person's name or a hot word. The to-be-error-corrected word may be taken as the target replacement word. That is, the to-be-error-corrected word is not updated. When the perplexity value is less than the preset perplexity threshold, it indicates that the meaning of the sentence updated based on the target candidate replacement word is the same as the meaning corresponding to the original speaker. The target text information may be updated based on the target candidate replacement word.

According to technical solutions of the present disclosure, the target text information may be processed by adopting the error correction manner corresponding to the error correction type, improving the efficiency of determining the to-be-error-corrected word in the text information and thereby improving the efficiency of updating the text information.

Embodiment Three

Figure 3:
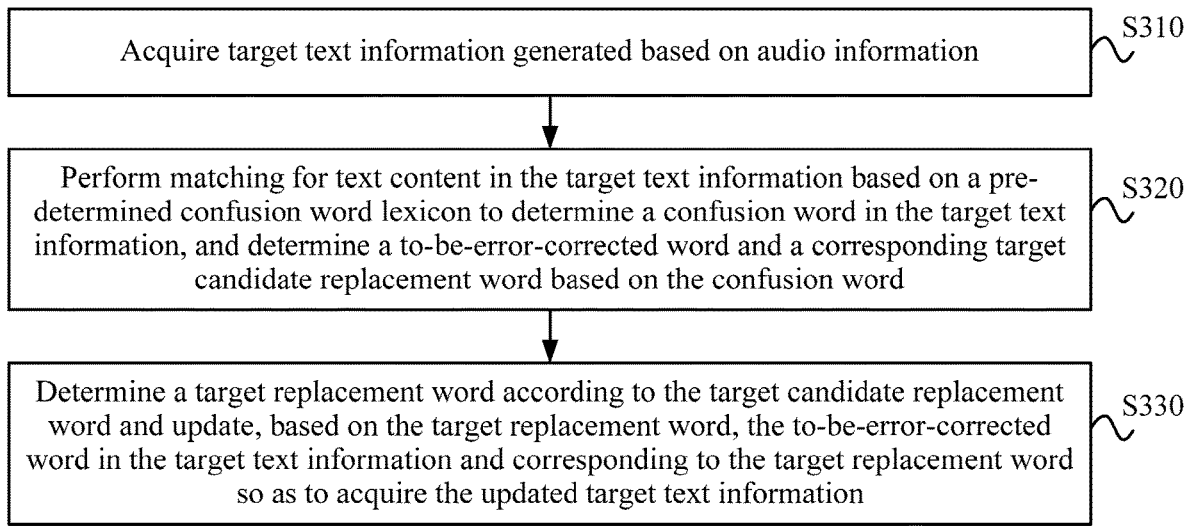
FIG. 3 is a flowchart of a text processing method according to embodiment three of the present disclosure.

FIG. 3 is a flowchart of another text processing method according to embodiment three of the present disclosure. On the basis of the preceding embodiments, the step in which "a to-be-error-corrected word in the target text information and a target candidate replacement word corresponding to the to-be-error-corrected word are determined" may be as follows: An error correction manner corresponding to an error correction type is adopted to determine the to-be-error-corrected word in the target text information and the target candidate replacement word corresponding to the to-be-error-corrected word so as to determine the target replacement word based on the target candidate replacement word.

The error correction type includes a type of text-pronunciation-based error correction and a type of text-content-based error correction. Different error correction types correspond to different error correction manners. According to technical solutions of embodiments of the present disclosure, two error correction manners may be adopted simultaneously to error-correct text information.

In this embodiment, in order to clearly introduce error correction manners corresponding to different error correction types, the type of text-content-based error correction may be introduced first. Terms identical to or similar to the preceding embodiments are not repeated here.

The error correction type further includes confusion word error correction and common word error correction. This embodiment makes an introduction by taking an example of confusion word error correction. The step in which "a to-be-error-corrected word in the target text information and a target candidate replacement word corresponding to the to-be-error-corrected word are determined" may be implemented as follows: "A confusion word in the target text information is determined based on a pre-determined confusion word lexicon, and a word in the confusion word lexicon corresponding to the confusion word is taken as the target candidate replacement word". Correspondingly, the step in which "the target replacement word corresponding to the to-be-error-corrected word is determined according to the target candidate replacement word, and the target text information is updated based on the target replacement word" may be implemented as follows: "the target replacement word is determined according to the target candidate replacement word, and the to-be-error-corrected word in the target text information corresponding to the target replacement word is updated based on the target replacement word". Terms identical to or similar to the preceding embodiments are not repeated here.

As shown in FIG. 3, the method includes the steps below.

In S310, target text information generated based on audio information is acquired.

In S320, matching is performed for text content in the target text information based on a pre-determined confusion word lexicon to determine a confusion word in the target text information, and a to-be-error-corrected word and a corresponding target candidate replacement word are determined based on the confusion word.

In practical application, words to be highly frequently wrong may be determined and taken as confusion words. In order to facilitate error correction on text in the text information, a plurality of confusion words may be stored in the confusion word lexicon so that the to-be-error-corrected word in the target text information may be determined based on the confusion word lexicon when error correction is performed. A word in the confusion word lexicon corresponding to the to-be-error-corrected word is taken as the target candidate replacement word.

In S330, a target replacement word is determined according to the target candidate replacement word, and the to-be-error-corrected word in the target text information corresponding to the target replacement word is updated based on the target replacement word so as to acquire the updated target text information.

It is to be noted that one target candidate replacement word is generally determined from the confusion word lexicon. Therefore, the target candidate replacement word may be taken as the target replacement word.

Exemplarily, after the target candidate replacement word is determined, the to-be-error-corrected word in the target text information may be updated based on the target candidate replacement word, thereby implementing the technical effect of updating the target text information.

According to technical solutions of embodiments of the present disclosure, the confusion word in the target text information may be determined first; moreover, the target replacement word corresponding to the confusion word in the confusion word lexicon is determined; then the confusion word in the target text information is replaced rapidly. With this arrangement, the technical effect of convenience and high efficiency in determining the to-be-error-corrected word in the target text information and the corresponding target replacement word is implemented.

Embodiment Four

Figure 4:
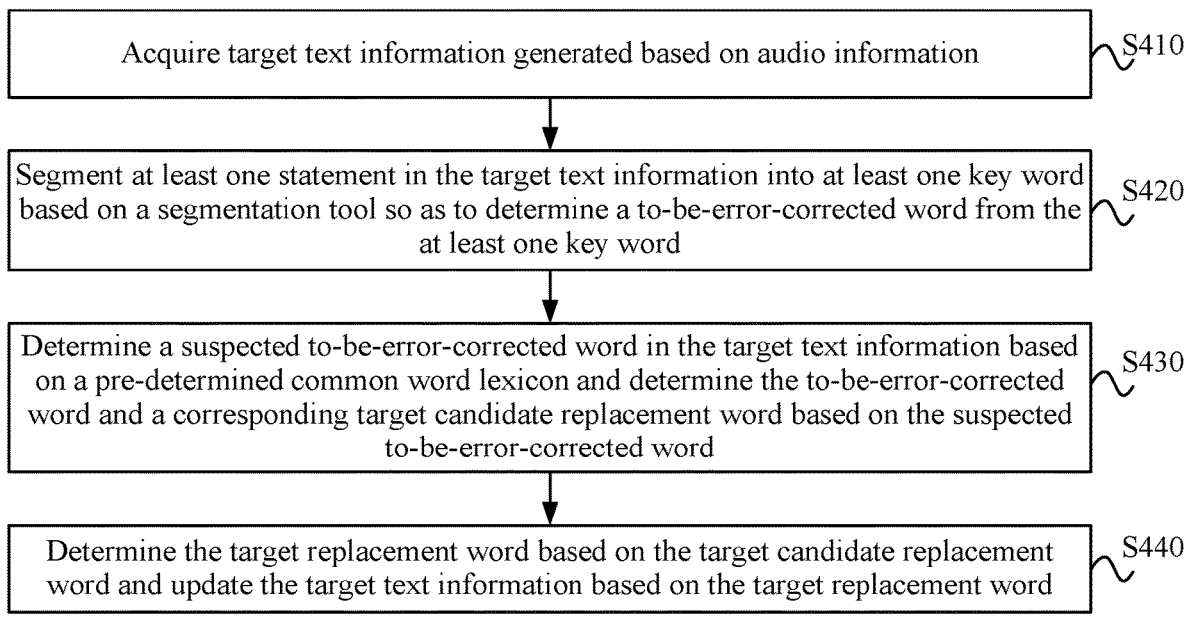
FIG. 4 is a flowchart of a text processing method according to embodiment four of the present disclosure.

FIG. 4 is a flowchart of a text processing method according to embodiment four of the present disclosure. On the basis of the preceding embodiments, when the confusion word in the target text information is determined, another wrong word in the target text information, that is, a common word in the target text information, may also be determined. That is, it is determined whether the to-be-error-corrected word exists among at least one key word, and thus the corresponding target replacement word is determined. Terms identical to or similar to the preceding embodiments are not repeated here.

As shown in FIG. 4, the method includes the steps below.

In S410, target text information generated based on audio information is acquired.

In S420, at least one sentence in the target text information is segmented into at least one key word based on a segmentation tool so as to determine a to-be-error-corrected word from the at least one key word.

Optionally, a sentence in the target text information is segmented to acquire at least one key word so as to determine the to-be-error-corrected word from the at least one key word.

At least one sentence in the target text information may be segmented into at least one key word based on the segmentation tool. It may be determined whether each key word is a to-be-error-corrected word. In the case where a key word is the to-be-error-corrected word, a corresponding target replacement word may be determined.

In S430, a suspected to-be-error-corrected word in the target text information is determined based on a pre-determined common word lexicon, and the to-be-error-corrected word and a corresponding target candidate replacement word are determined based on the suspected to-be-error-corrected word.

The common word lexicon is pre-established and configured to store common words. When words from all key words are preliminarily determined as to-be-error-corrected words, such words may be taken as suspected to-be-error-corrected words.

Exemplarily, after at least one key word is determined, it may be determined whether a word corresponding to each key word exists in the common word lexicon. In the case where a word corresponding to each key word exists in the common word lexicon, each key word is determined as a correct word. In the case where a word corresponding to each key word does not exist in the common word lexicon, each key word is determined as a suspected to-be-error-corrected word.

In order to improve the accuracy of determining the to-be-error-corrected word, after the suspected to-be-error-corrected words are determined, each correct word may be screened out again from the suspected to-be-error-corrected words. The remaining words are taken as to-be-error-corrected words. Moreover, a target replacement word corresponding to each to-be-error-corrected word may be determined. In this embodiment, the step in which the to-be-error-corrected word and the corresponding target candidate replacement word are determined from the suspected to-be-error-corrected word may be as follows: If a key word not included in the common word lexicon is determined based on the common word lexicon, a suspected to-be-error-corrected word set is determined based on the key word not included in the common word lexicon, where the suspected to-be-error-corrected word set includes at least one suspected to-be-error-corrected word; the to-be-error-corrected word is acquired by verifying the at least one suspected to-be-error-corrected word; at least one replacement word corresponding to the to-be-error-corrected word is determined based on each to-be-error-corrected word; and at least one target candidate replacement word is determined based on the at least one replacement word so as to determine the target replacement word based on the at least one target candidate replacement word.

Exemplarily, it may be determined according to the at least one key word in the target information whether the common word lexicon includes each key word. A key word existing in the common word lexicon is taken as a correct word. A key word not included in the common word lexicon is taken as a suspected to-be-error-corrected word. The suspected to-be-error-corrected word set may be determined according to the at least one suspected to-be-error-corrected word. After each suspected to-be-error-corrected word is determined, secondary check processing may be performed for each suspected to-be-error-corrected word so as to reduce the number of suspected to-be-error-corrected words, thereby improving the efficiency of determining the target replacement word corresponding to the to-be-error-correct word. A word with a result of the secondary check processing being uncertain is taken as the to-be-error-corrected word. After the to-be-error-corrected word is determined, the at least one replacement word corresponding to the to-be-error-corrected word may be determined. The at least one target candidate replacement word can be determined through replacement word processing. Moreover, the target replacement word is determined from the at least one target candidate replacement word by using a series of manners. Further, the target text information is updated according to the target replacement word.

In this embodiment, in order to improve the accuracy of determining the to-be-error-corrected word so as to achieve the technical effect of improving the efficiency of updating the target text information, secondary check processing may be performed for a suspected to-be-error-corrected word to determine whether the suspected to-be-error-corrected word is the to-be-error-corrected word. Optionally, for each suspected to-be-error-corrected word, a current position of a suspected to-be-error-corrected word in the target text information is determined; text with a preset number of characters before and after the current position is acquired based on the current position and is combined with the suspected to-be-error-corrected word to acquire at least one combined word; when no word corresponding to a combined word is matched from the common word lexicon, a candidate suspected to-be-error-corrected word is generated based on the suspected to-be-error-corrected word corresponding to the combined word matching no corresponding word; and at least one to-be-error-corrected word is determined by processing each candidate suspected to-be-error-corrected word.

The suspected to-be-error-corrected word set includes at least one suspected to-be-error-corrected word. The current position refers to a position where the suspected to-be-error-corrected word is located in the target text. The text with a preset number of characters before and after the current position may be acquired based on the current position. The text may be combined with the suspected to-be-error-corrected word to acquire the at least one combined word. When a word corresponding to a combined word is matched from the common word lexicon, the suspected to-be-error-corrected word corresponding to the combined word matching the corresponding word is removed from the suspected to-be-error-corrected word set. That is, the suspected to-be-error-corrected word is a correct word. A correct word may be screened out by processing the at least one suspected to-be-error-corrected word in the suspected to-be-error-corrected word set. A suspected to-be-error-corrected word that cannot be determined as a correct word is taken as a candidate suspected to-be-error-corrected word. That is, the candidate suspected to-be-error-corrected word is a word that cannot be determined as a correct word after secondary check processing is performed for a suspected to-be-error-corrected word.

On the basis of the preceding technical solutions, when a word corresponding to a combined word is matched from the common word lexicon, it indicates that a suspected to-be-error-corrected word corresponding to the combined word matching the corresponding word is a common word. The suspected to-be-error-corrected word may be removed from the suspected to-be-error-corrected word set. In this case, the number of to-be-error-corrected words may be reduced, thereby improving the accuracy and convenience of determining the to-be-error-corrected words.

In order to determine a to-be-error-corrected word from each candidate suspected to-be-error-corrected word and thereby improve the accuracy of determining the to-be-error-corrected word, it may be as follows: For each candidate suspected to-be-error-corrected word, the feature information of a candidate suspected to-be-error-corrected word in a sentence to which the candidate suspected to-be-error-corrected word belongs is determined based on a text feature extraction model, and the feature information is input into a pre-trained branch model to acquire an assessment value corresponding to the feature information; when the assessment value is greater than or equal to a preset assessment threshold, the candidate suspected to-be-error-corrected word is taken as a common word and removed from the suspected to-be-error-corrected word set; and the branch model is configured to determine a matching degree between the input feature information and the feature information of the sentence. When the assessment value is less than the preset assessment threshold, a to-be-error-corrected word is generated based on the candidate suspected to-be-error-corrected word.

That is, after the candidate suspected to-be-error-corrected word is determined, each candidate suspected to-be-error-corrected word may be processed in sequence so as to determine whether the candidate suspected to-be-error-corrected word is a to-be-error-corrected word.

Exemplarily, for each candidate suspected to-be-error-corrected word, the sentence to which the candidate suspected to-be-error-corrected word belongs in the target text may be determined. After the sentence is input into the text feature extraction model, the feature information of the sentence to which the candidate suspected to-be-error-corrected word belongs is output. The feature information is input into the branch model to acquire the assessment value corresponding to the feature information. When the acquired assessment value is greater than or equal to the preset assessment threshold, it indicates that the candidate suspected to-be-error-corrected word is a common word. When the acquired assessment value is less than the preset assessment threshold, it indicates that the candidate suspected to-be-error-corrected word is a to-be-error-corrected word. After the to-be-error-corrected word is determined, a target replacement word corresponding to each to-be-error-corrected word may be determined so as to update the target text information, improving the accuracy of text information and thereby improving user experience and the efficiency of interaction.

In this embodiment, after the to-be-error-corrected word is determined, a replacement word corresponding to each to-be-error-corrected word may be determined. Further, the target replacement word is determined from all replacement words. Optionally, for each to-be-error-corrected word, the at least one replacement word corresponding to the to-be-error-corrected word is determined according to an editing distance between the to-be-error-corrected word and another word, the number of maximum common character strings, and a usage frequency of a word.

The editing distance may be a corresponding distance when the other word is edited as the to-be-error-corrected word. A maximum common character string is the number of strings shared by the to-be-error-corrected word and the other word. The usage frequency of a word is a usage frequency of the other word. The at least one replacement word corresponding to the to-be-error-corrected word may be determined comprehensively based on the preceding factors. Optionally, ten replacement words corresponding to each to-be-error-corrected word are determined.

After the at least one replacement word is determined, a certain number of target candidate replacement words may be determined first so as to acquire a word with a relatively high matching degree against the to-be-error-corrected word. Further, the target replacement word is determined from the target candidate replacement words. Optionally, for each replacement word corresponding to the to-be-error-corrected word, a sentence to which a replacement word belongs is acquired; a similarity value between the to-be-error-corrected word and the sentence is determined, and a perplexity value of the sentence is determined after the to-be-error-corrected word is replaced based on the replacement word; and it is determined based on the perplexity value and the similarity value that a preset number of replacement words serve as the at least one target candidate replacement word.

That is, after the to-be-error-corrected word is determined, a replacement word corresponding to each to-be-error-corrected word may be determined. The sentence to which the to-be-error-corrected word belongs in the target text information is acquired, and the similarity value between the to-be-error-corrected word and the sentence is determined. Moreover, the to-be-error-corrected word in the sentence may be updated based on the replacement word, and the perplexity value of the sentence is determined. The at least one replacement word may be sorted based on a similarity value and a perplexity value that correspond to each replacement word. Based on a sorting result, a preset number of replacement words are selected as the at least one target candidate replacement word. Optionally, the first four replacement words are selected as target candidate replacement words based on the sorting result.

Of course, if the to-be-error-corrected word does not exist in the at least one target candidate replacement word, the to-be-error-corrected word may be added to the at least one target candidate replacement word.

After a target candidate replacement word corresponding to each to-be-error-corrected word is determined, the target text information may be determined therefrom. Optionally, for each target candidate replacement word, the sentence to which the to-be-error-corrected word belongs and an association feature between the target candidate replacement word and the sentence are determined, where the association feature includes a similarity between a target candidate word and the sentence; the association feature is input into a pre-trained feature processing model to acquire a matching degree value between the candidate word and the sentence; and the target replacement word corresponding to the to-be-error-corrected word is determined from the at least one target candidate replacement word based on a matching degree value of each target candidate word.

That is, for each target candidate replacement word, the to-be-error-corrected word corresponding to the target candidate replacement word may be determined, and the sentence to which the to-be-error-corrected word belongs is determined. The association feature between the target candidate replacement word and the sentence is determined. The association feature is input into the pre-trained feature processing model so that the matching degree value between the target candidate replacement word and the sentence may be determined. After the matching degree value of the at least one target candidate replacement word corresponding to the to-be-error-corrected word is determined, the target candidate replacement word with the highest matching degree value may be taken as the target replacement word.

In S440, the target replacement word is determined based on the target candidate replacement word, and the target text information is updated based on the target replacement word.

According to technical solutions of embodiments of the present disclosure, the to-be-error-corrected word in the target text information and the corresponding target replacement word are determined by using a series of manners, improving the accuracy of determining the to-be-error-corrected word, correspondingly improving the accuracy of determining the target replacement word corresponding to the to-be-error-corrected word, thereby improving the correspondence between the updated target text information and the audio information of a speaker, and thus improving the efficiency of interaction.

Embodiment Five

Figure 5:
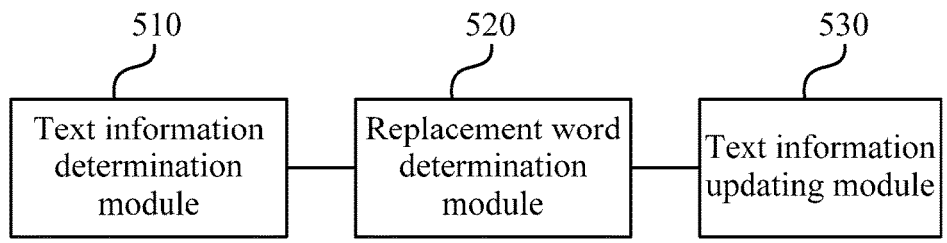
FIG. 5 is a diagram illustrating the structure of a text processing apparatus according to embodiment five of the present disclosure.

FIG. 5 is a diagram illustrating the structure of a text processing apparatus according to embodiment five of the present disclosure. As shown in FIG. 5, the apparatus includes a text information determination module 510, a replacement word determination module 520, and a text information updating module 530.

The text information determination module 510 is configured to acquire target text information generated based on audio information in an interactive process based on a real-time interactive interface. The replacement word determination module 520 is configured to determine a to-be-error-corrected word in the target text information and a replacement word corresponding to the to-be-error-corrected word. The text information updating module 530 is configured to determine, according to the replacement word, a target replacement word corresponding to the to-be-error-corrected word and update the target text information based on the target replacement word.

The text information determination module is further configured to perform the steps below after acquiring the target text information generated based on the audio information.

The audio information of a speaker is collected and converted to corresponding text information.

Current text content displayed on a client is generated according to the text information, a speech timestamp corresponding to the speaker, and an identifier of the speaker; and the target text information is determined based on the current text content.

Optionally, the text information determination module is configured to determine a timestamp of text content without error correction among all text content, to acquire the text content without error correction within a preset duration based on the timestamp, and to determine the target text information based on the text content without error correction.

Optionally, the replacement word determination module is configured to adopt an error correction manner corresponding to an error correction type to determine the to-be-error-corrected word in the target text information and the replacement word corresponding to the to-be-error-corrected word so as to determine the target replacement word based on the replacement word. The error correction type includes a type of text-pronunciation-based error correction and a type of text-content-based error correction.

Optionally, the error correction type includes the type of text-pronunciation-based error correction. The replacement word determination module is further configured to perform the following steps: A pronunciation of each piece of text in the target text information is acquired; it is determined according to the pronunciation of each piece of text and hot words pre-stored in a hot word dictionary whether a target hot word corresponding to the pronunciation of each piece of text exists in the target text information, where the hot word dictionary is configured to store a plurality of hot words, and the hot words are determined based on audio information and text information that are collected in a real-time interactive process; and in response to the target hot word corresponding to the pronunciation of each piece of text existing in the target text information, the to-be-error-corrected word in the target text information is determined according to the target hot word, and the target candidate replacement word is determined based on the to-be-error-corrected word.

Optionally, the type of text-pronunciation-based error correction includes a type of pinyin-based error correction.

Optionally, the text information updating module is configured to perform the following steps: A first to-be-processed sentence to which the to-be-error-corrected word belongs in the target text information is acquired, and the first to-be-processed sentence is updated based on the replacement word to acquire a second to-be-processed sentence; a perplexity value of the second to-be-processed sentence is determined; when the perplexity value is greater than or equal to a preset perplexity threshold, the target replacement word is determined according to the to-be-error-corrected word; and when the perplexity value is less than the preset perplexity threshold, the target replacement word is determined according to the replacement word.

Optionally, the error correction type includes the type of text-content-based error correction.

The replacement word determination module is configured to perform the following steps: Matching is performed for text content in the target text information based on a pre-determined confusion word lexicon to determine a confusion word in the target text information, and the to-be-error-corrected word and the corresponding replacement word are determined based on the confusion word; and/or a suspected to-be-error-corrected word in the target text information is determined based on a pre-determined common word lexicon, and the to-be-error-corrected word and the corresponding replacement word are determined based on the suspected to-be-error-corrected word.

Optionally, the replacement word determination module is configured to determine the confusion word in the target text information based on the confusion word lexicon and take a word in the confusion word lexicon corresponding to the confusion word as the replacement word. Correspondingly, the step in which the target replacement word corresponding to the to-be-error-corrected word is determined according to the replacement word and the target text information is updated based on the target replacement word includes that the target replacement word is determined according to the replacement word, and that the to-be-error-corrected word in the target text information corresponding to the target replacement word is updated based on the target replacement word.

Optionally, the replacement word determination module is configured to segment a sentence in the target text information to acquire at least one key word so as to determine the to-be-error-corrected word from the at least one key word.

Optionally, the replacement word determination module is configured to perform the following steps: If a key word not included in the common word lexicon is determined based on the common word lexicon, a suspected to-be-error-corrected word set is determined based on the key word not included in the common word lexicon, where the suspected to-be-error-corrected word set includes at least one suspected to-be-error-corrected word; the to-be-error-corrected word is acquired by verifying the at least one suspected to-be-error-corrected word; at least one replacement word corresponding to the to-be-error-corrected word is determined based on the to-be-error-corrected word; and at least one target candidate replacement word is determined based on the at least one replacement word so as to determine the target replacement word based on the at least one target candidate replacement word.

Optionally, the replacement word determination module is configured to perform the following steps: for each suspected to-be-error-corrected word, a current position of a suspected to-be-error-corrected word in the target text information is determined; text with a preset number of characters before and after the current position is acquired based on the current position and is combined with the suspected to-be-error-corrected word to acquire at least one combined word; when no word corresponding to a combined word is matched from the common word lexicon, a candidate suspected to-be-error-corrected word is generated based on the suspected to-be-error-corrected word corresponding to the combined word matching no corresponding word; and the feature information of each candidate suspected to-be-error-corrected word in a sentence to which each candidate suspected to-be-error-corrected word belongs is determined, and at least one to-be-error-corrected word is determined according to the feature information.

Optionally, the replacement word determination module is configured to, when a word corresponding to a combined word is matched from the common word lexicon, remove, from the suspected to-be-error-corrected word set, a suspected to-be-error-corrected word corresponding to the combined word matching the corresponding word.

Optionally, the replacement word determination module is configured to perform the following steps: For each candidate suspected to-be-error-corrected word, the feature information of a candidate suspected to-be-error-corrected word in a sentence to which the candidate suspected to-be-error-corrected word belongs is determined based on a text feature extraction model; the feature information is input into a pre-trained branch model to acquire an assessment value corresponding to the feature information; when the assessment value is greater than or equal to a preset assessment threshold, the candidate suspected to-be-error-corrected word is taken as a common word and removed from the suspected to-be-error-corrected word set; and the branch model is configured to determine a matching degree between the input feature information and the feature information of the sentence.

Optionally, the replacement word determination module is configured to, when the assessment value is less than the preset assessment threshold, generate the to-be-error-corrected word based on the candidate suspected to-be-error-corrected word.

Optionally, the replacement word determination module is configured to, for each to-be-error-corrected word, determine the at least one replacement word corresponding to a to-be-error-corrected word according to an editing distance between the to-be-error-corrected word and another word, the number of maximum common character strings, and a usage frequency of a word.

Optionally, the replacement word determination module is configured to perform the following steps: For each replacement word corresponding to the to-be-error-corrected word, a sentence to which a replacement word belongs is acquired; a similarity value between the to-be-error-corrected word and the sentence is determined, and a perplexity value of the sentence is determined after the to-be-error-corrected word is replaced based on the replacement word; and it is determined based on the perplexity value and the similarity value that a preset number of replacement words serve as the at least one target candidate replacement word.

Optionally, the replacement word determination module is configured to perform the following steps: For each target candidate replacement word, an association feature between the target candidate replacement word and a sentence to which the target suspected word belongs, where the association feature includes a similarity between a target candidate word and the sentence; the association feature is input into a pre-trained feature processing model to acquire a matching degree value between the candidate word and the sentence; and the target replacement word corresponding to the to-be-error-corrected word is determined from the at least one target candidate replacement word based on a matching degree value of each target candidate word.

According to technical solutions of embodiments of the present disclosure, target text information generated based on audio information is acquired; a to-be-error-corrected word in the target text information and a target candidate replacement word corresponding to the to-be-error-corrected word are determined; a target replacement word corresponding to the to-be-error-corrected word is determined according to the target candidate replacement word, and the target text information is updated based on the target replacement word. This arrangement solves the following technical problem in the related art: A great number of errors may exist in the text generated based on audio information, not facilitating user reading, thus resulting in poor user experience, and greatly reducing the efficiency of interaction. With this arrangement, when the text is generated based on audio information, a wrong word in the text and a corresponding replacement word are acquired and dynamically updated in the text so that the error rate in the acquired text is reduced greatly, thereby implementing the technical effect of improving user experience and the efficiency of interaction.

The text processing apparatus according to embodiments of the present disclosure can perform the text processing method according to any embodiment of the present disclosure, and has functional modules and effects corresponding to the performed method.

It is to be noted that units and modules included in the preceding apparatus are divided according to function logic but are not limited to such division, as long as the corresponding functions can be achieved. Moreover, the names of function units are used for distinguishing between each other and not intended to limit the scope of embodiments of the present disclosure.

Embodiment Seven

Figure 6:
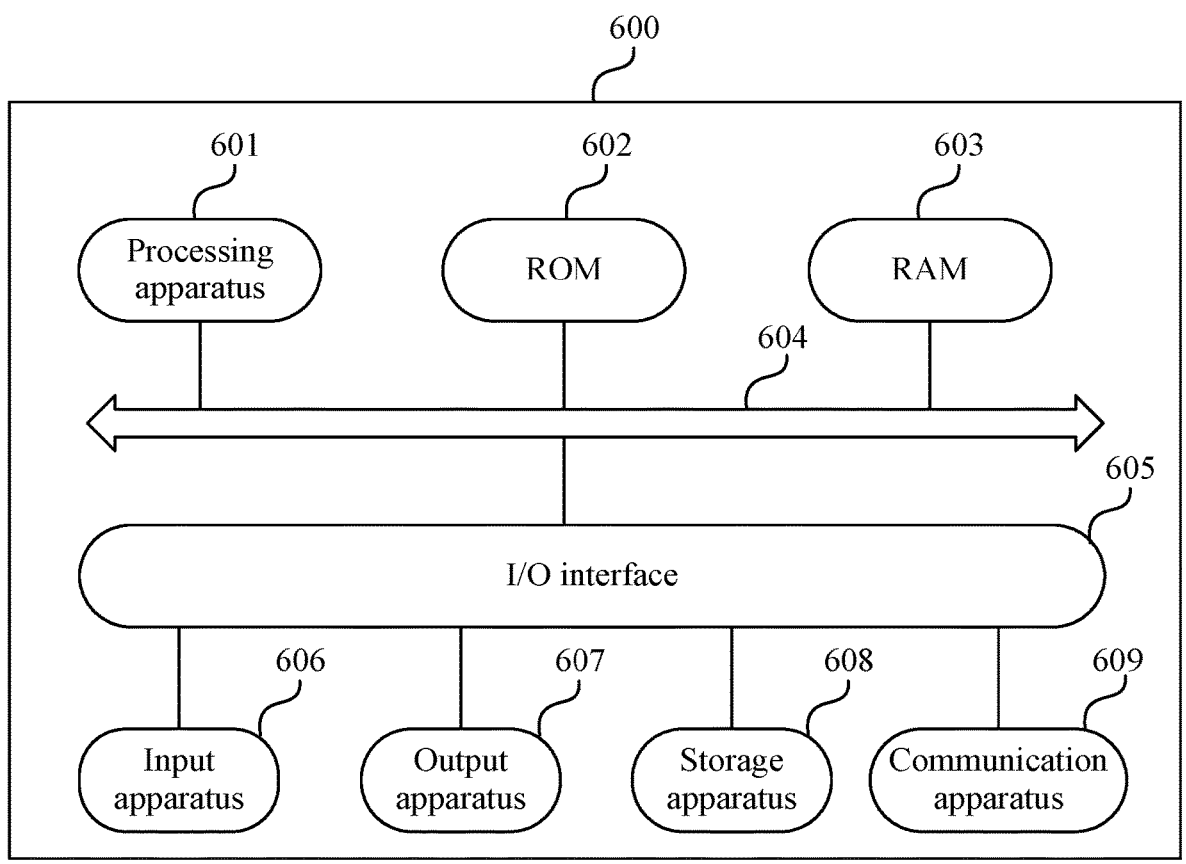
FIG. 6 is a diagram illustrating the structure of an electronic device according to embodiment six of the present disclosure.

FIG. 6 shows a diagram illustrating the structure of an electronic device 600 (such as the terminal device or server in FIG. 6) applicable to implementing an embodiment of the present disclosure. The terminal device in embodiments of the present disclosure may include, but is not limited to, mobile terminals such as a mobile phone, a laptop, a digital broadcast receiver, a personal digital assistant (PDA), a tablet computer (PAD), a portable media player (PMP), and an in-vehicle terminal (such as an in-vehicle navigation terminal) and stationary terminals such as a digital television (TV) and a desktop computer. The electronic device shown in FIG. 6 is merely an example and should not impose any limitation to the function and usage scope of embodiments of the present disclosure.

As shown in FIG. 6, the electronic device 600 may include a processing apparatus (such as a central processing unit or a graphics processing unit) 601. The processing apparatus 601 may perform various proper actions and processing according to a program stored in a read-only memory (ROM) 602 or a program loaded into a random-access memory (RAM) 603 from a storage apparatus 608. Various programs and data required for the operation of the electronic device 600 are also stored in the RAM 603. The processing apparatus 601, the ROM 602, and the RAM 603 are connected to each other via a bus 604. An input/output (I/O) interface 605 is also connected to the bus 604.

Generally, the following apparatuses may be connected to the I/O interface 605: an input apparatus 606 including, for example, a touchscreen, a touchpad, a keyboard, a mouse, a camera, a microphone, an accelerometer, and a gyroscope, an output apparatus 607 including, for example, a liquid crystal display (LCD), a speaker, and a vibrator, the storage apparatus 608 including, for example, a magnetic tape and a hard disk, and a communication apparatus 609. The communication apparatus 609 may allow the electronic device 600 to perform wireless or wired communication with other devices to exchange data. Although FIG. 6 shows the electronic device 600 having various apparatuses, it is to be understood that it is not required to implement or have all the shown apparatuses. Alternatively, more or fewer apparatuses may be implemented or present.

Particularly, according to embodiments of the present disclosure, the process described above with reference to a flowchart may be implemented as a computer software program. For example, a computer program product is included in embodiments of the present disclosure. The computer program product includes a computer program carried in a non-transitory computer-readable medium. The computer program includes program codes for executing the method shown in the flowchart. In such an embodiment, the computer program may be downloaded from a network and installed through the communication apparatus 609, or may be installed from the storage apparatus 608, or may be installed from the ROM 602. When the computer program is executed by the processing apparatus 601, the preceding functions defined in the methods in embodiments of the present disclosure are implemented.

The electronic device provided in embodiments of the present disclosure and the text processing method provided in the preceding embodiments belong to the same concept. For technical details not described in this embodiment, reference may be made to the preceding embodiments.

Embodiment Eight

Embodiments of the present disclosure provide a non-transitory_computer storage medium storing a computer program. When the computer program is executed by a processor, text processing method provided in the preceding embodiments is performed.

It is to be noted that the preceding computer-readable medium in the present disclosure may be a computer-readable signal medium or a computer-readable storage medium or any combination thereof. The computer-readable storage medium may be, but is not limited to, an electrical, magnetic, optical, electromagnetic, infrared, or semiconductor system, apparatus, or device, or any combination thereof. Specifically, the computer-readable storage medium may include, but is not limited to, an electrical connection having one or more wires, a portable computer disk, a hard disk, a random access memory (RAM), a read-only memory (ROM), an erasable programmable read-only memory (EPROM) or flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the HyperText Transfer Protocol (HTTP), and may be interconnected with any form or medium of digital data communication (such as a communication network). Examples of the communication network include a local area network (LAN), a wide area network (WAN), an internet (for example, the Internet), a peer-to-peer network (for example, an Ad-Hoc network), and any network currently known or to be developed in the future.

The computer-readable medium may be included in the electronic device or may exist alone without being assembled into the electronic device.

The computer-readable medium carries at least one program. When the at least one program is executed by the electronic device, the electronic device is configured to perform the functions below.

Target text information generated based on audio information is acquired.

A to-be-error-corrected word in the target text information and a target candidate replacement word corresponding to the to-be-error-corrected word are determined.

A target replacement word corresponding to the to-be-error-corrected word is determined according to the target candidate replacement word, and the target text information is updated based on the target replacement word.

Computer program codes for executing operations in the present disclosure may be written in one or more programming languages or a combination thereof. The preceding programming languages include, but are not limited to, object-oriented programming languages such as Java, Smalltalk, and C++ and may also include conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent a module, program segment, or part of codes, where the module, program segment, or part of codes includes at least one executable instruction for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system executing a specified function or operation or may be implemented by a combination of special-purpose hardware and computer instructions.

The units involved in embodiments of the present disclosure may be implemented by software or hardware. The name of a unit is not intended to limit the unit in a certain circumstance. For example, a text information determination module may also be described as an "information determination module".

The functions described above herein may be at least partially implemented by at least one hardware logic component. For example, without limitation, example types of hardware logic components that can be used include a field-programmable gate array (FPGA), an application-specific integrated circuit (ASIC), an application-specific standard product (ASSP), a system-on-chip (SoC), a complex programmable logic device (CPLD), and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium include an electrical connection based on at least one wire, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to at least one embodiment of the present disclosure, example one provides a text processing method. The method includes the steps below. Target text information generated based on audio information is acquired.

A to-be-error-corrected word in the target text information and a target candidate replacement word corresponding to the to-be-error-corrected word are determined.

A target replacement word corresponding to the to-be-error-corrected word is determined according to the target candidate replacement word, and the target text information is updated based on the target replacement word.

According to at least one embodiment of the present disclosure, example two provides a text processing method. The method includes the steps below. Optionally, before the target text information generated based on the audio information is acquired, the method further includes the steps below.

The audio information of a speaker is collected and converted to corresponding text information.

Current text content displayed on a client is generated according to the text information, a speech timestamp corresponding to the speaker, and an identifier of the speaker; and the target text information is determined based on the current text content.

According to at least one embodiment of the present disclosure, example three provides a text processing method. The method includes the steps below.

Optionally, a timestamp of text content without error correction is determined among all text content, and the text content without error correction within a preset duration is acquired based on the timestamp.

The target text information is determined based on the text content without error correction.

According to at least one embodiment of the present disclosure, example four provides a text processing method. The method includes the steps below.

Optionally, the step in which the to-be-error-corrected word in the target text information and the replacement word corresponding to the to-be-error-corrected word are determined includes the step below.

An error correction manner corresponding to an error correction type is adopted to determine the to-be-error-corrected word in the target text information and the replacement word corresponding to the to-be-error-corrected word so as to determine the target replacement word based on the replacement word.

The error correction type includes a type of text-pronunciation-based error correction and a type of text-content-based error correction.

According to at least one embodiment of the present disclosure, example five provides a text processing method. The method includes the steps below.

Optionally, the error correction type includes the type of text-pronunciation-based error correction. The step in which the error correction manner corresponding to the error correction type is adopted to determine the to-be-error-corrected word in the target text information and the target candidate replacement word corresponding to the to-be-error-corrected word includes the steps below.

A pronunciation of each piece of text in the target text information is acquired.

It is determined according to the pronunciation of each piece of text and hot words pre-stored in a hot word dictionary whether a target hot word corresponding to the pronunciation of each piece of text exists in the target text information, where the hot word dictionary is configured to store a plurality of hot words, and the hot words are determined based on audio information and text information that are collected in a real-time interactive process.

In response to the target hot word corresponding to the pronunciation of each piece of text existing in the target text information, the to-be-error-corrected word in the target text information is determined according to the target hot word, and the target candidate replacement word is determined based on the to-be-error-corrected word.

According to at least one embodiment of the present disclosure, example six provides a text processing method. The method includes the aspect below.

Optionally, the type of text-pronunciation-based error correction includes a type of pinyin-based error correction.

According to at least one embodiment of the present disclosure, example seven provides a text processing method. The method includes the steps below.

Optionally, the step in which the target replacement word corresponding to the to-be-error-corrected word is determined based on the replacement word and the target text information is updated based on the target replacement word includes the steps below.

A first to-be-processed sentence to which the to-be-error-corrected word belongs in the target text information is acquired, and the first to-be-processed sentence is updated based on the replacement word to acquire a second to-be-processed sentence.

A perplexity value of the second to-be-processed sentence is determined.

When the perplexity value is greater than or equal to a preset perplexity threshold, the target replacement word is determined according to the to-be-error-corrected word.

When the perplexity value is less than the preset perplexity threshold, the target replacement word is determined according to the replacement word.

According to at least one embodiment of the present disclosure, example eight provides a text processing method. The method includes the steps below.

Optionally, the error correction type includes the type of text-pronunciation-based error correction. The step in which the error correction manner corresponding to the error correction type is adopted to determine the to-be-error-corrected word in the target text information and the target candidate replacement word corresponding to the to-be-error-corrected word so as to determine the target replacement word based on the target candidate replacement word includes the steps below.

Matching is performed for text content in the target text information based on a pre-determined confusion word lexicon to determine a confusion word in the target text information, and the to-be-error-corrected word and the corresponding target candidate replacement word are determined based on the confusion word; and/or, a suspected to-be-error-corrected word in the target text information is determined based on a pre-determined common word lexicon, and the to-be-error-corrected word and the corresponding target candidate replacement word are determined based on the suspected to-be-error-corrected word.

According to at least one embodiment of the present disclosure, example nine provides a text processing method. The method includes the steps below.

Optionally, the step in which the matching is performed for the text content in the target text information based on the pre-determined confusion word lexicon to determine the confusion word in the target text information and the to-be-error-corrected word and the corresponding replacement word are determined based on the confusion word includes the steps below.

The confusion word in the target text information is determined based on the confusion word lexicon, and a word in the confusion word lexicon corresponding to the confusion word is taken as the replacement word.

Correspondingly, the step in which the target replacement word corresponding to the to-be-error-corrected word is determined based on the replacement word and the target text information is updated based on the target replacement word includes the steps below.

The target replacement word is determined according to the replacement word.

The to-be-error-corrected word in the target text information corresponding to the target replacement word is updated based on the target replacement word.

According to at least one embodiment of the present disclosure, example ten provides a text processing method. The method includes the steps below.

Optionally, before the suspected to-be-error-corrected word in the target text information is determined based on the pre-determined common word lexicon, and the to-be-error-corrected word and the corresponding target candidate replacement word are determined based on the suspected to-be-error-corrected word, the method further includes the step below.

A sentence in the target text information is segmented to acquire at least one key word so as to determine the to-be-error-corrected word from the at least one key word.

According to at least one embodiment of the present disclosure, example eleven provides a text processing method. The method includes the steps below.

Optionally, the step in which the to-be-error-corrected word in the target text information and the target candidate replacement word corresponding to the to-be-error-corrected word are determined includes the steps below.

If a key word not included in the common word lexicon is determined based on the common word lexicon, a suspected to-be-error-corrected word set is determined based on the key word not included in the common word lexicon, where the suspected to-be-error-corrected word set includes at least one suspected to-be-error-corrected word.

The to-be-error-corrected word is acquired by verifying the at least one suspected to-be-error-corrected word, and at least one replacement word corresponding to the to-be-error-corrected word is determined based on the to-be-error-corrected word.

At least one target candidate replacement word is determined based on the at least one replacement word so as to determine the target replacement word based on the at least one target candidate replacement word.

According to at least one embodiment of the present disclosure, example twelve provides a text processing method. The method includes the steps below.

Optionally, the step in which the to-be-error-corrected word is acquired by verifying the at least one suspected to-be-error-corrected word includes the steps below.

For each suspected to-be-error-corrected word, a current position of a suspected to-be-error-corrected word in the target text information is determined.

Text with a preset number of characters before and after the current position is acquired based on the current position and is combined with the suspected to-be-error-corrected word to acquire at least one combined word.

When no word corresponding to a combined word is matched from the common word lexicon, a candidate suspected to-be-error-corrected word is generated based on the suspected to-be-error-corrected word corresponding to the combined word matching no corresponding word.

The feature information of each candidate suspected to-be-error-corrected word in a sentence to which each candidate suspected to-be-error-corrected word belongs is determined, and at least one to-be-error-corrected word is determined according to the feature information.

According to at least one embodiment of the present disclosure, example thirteen provides a text processing method. The method includes the steps below.

Optionally, when a word corresponding to a combined word is matched from the common word lexicon, a suspected to-be-error-corrected word corresponding to the combined word matching the corresponding word is removed from the suspected to-be-error-corrected word set.

According to at least one embodiment of the present disclosure, example fourteen provides a text processing method. The method includes the steps below.

Optionally, the step in which the feature information of each candidate suspected to-be-error-corrected word in the sentence to which each candidate suspected to-be-error-corrected word belongs is determined and the at least one to-be-error-corrected word is determined according to the feature information includes the steps below.

For each candidate suspected to-be-error-corrected word, the feature information of a candidate suspected to-be-error-corrected word in a sentence to which the candidate suspected to-be-error-corrected word belongs is determined based on a text feature extraction model.

The feature information is input into a pre-trained branch model to acquire an assessment value corresponding to the feature information.

When the assessment value is greater than or equal to a preset assessment threshold, the candidate suspected to-be-error-corrected word is taken as a common word and removed from the suspected to-be-error-corrected word set.

The branch model is configured to determine a matching degree between the input feature information and the feature information of the sentence.

According to at least one embodiment of the present disclosure, example fifteen provides a text processing method. The method includes the step below.

Optionally, when the assessment value is less than the preset assessment threshold, the to-be-error-corrected word is generated based on the candidate suspected to-be-error-corrected word.

According to at least one embodiment of the present disclosure, example sixteen provides a text processing method. The method includes the steps below.

Optionally, the step in which at least one replacement word corresponding to a to-be-error-corrected word is determined based on the to-be-error-corrected word includes the step below.

For each to-be-error-corrected word, the at least one replacement word corresponding to the target suspected word is determined according to an editing distance between the to-be-error-corrected word and another word, the number of maximum common character strings, and a usage frequency of a word.

According to at least one embodiment of the present disclosure, example seventeen provides a text processing method. The method includes the steps below.

Optionally, the step in which the at least one target candidate replacement word is determined based on the at least one replacement word includes the steps below.

For each replacement word corresponding to the to-be-error-corrected word, a sentence to which a replacement word belongs is acquired; a similarity value between the to-be-error-corrected word and the sentence is determined, and a perplexity value of the sentence is determined after the to-be-error-corrected word is replaced based on the replacement word; and it is determined based on a perplexity value of each replacement word and a similarity value of each replacement word that a preset number of replacement words serve as the at least one target candidate replacement word.

According to at least one embodiment of the present disclosure, example eighteen provides a text processing method. The method includes the steps below.

Optionally, the step in which the target replacement word corresponding to the to-be-error-corrected word is determined according to the target candidate replacement word and the target text information is updated based on the target replacement word includes the steps below.

For each target candidate replacement word, the sentence to which the to-be-error-corrected word belongs and an association feature between the target candidate replacement word and the sentence are determined, where the association feature includes a similarity between a target candidate word and the sentence.

The association feature is input into a pre-trained feature processing model to acquire a matching degree value between the target candidate replacement word and the sentence.

The target replacement word corresponding to the to-be-error-corrected word is determined from the at least one target candidate replacement word based on a matching degree value of each target candidate replacement word.

According to at least one embodiment of the present disclosure, example nineteen provides a text processing apparatus. The apparatus includes a text information determination module, a replacement word determination module, and a text information updating module.

Optionally, the text information determination module is configured to acquire target text information generated based on audio information.

The replacement word determination module is configured to determine a to-be-error-corrected word in the target text information and a target candidate replacement word corresponding to the to-be-error-corrected word.

The text information updating module is configured to determine, according to the replacement word, a target replacement word corresponding to the to-be-error-corrected word and update the target text information based on the target replacement word.

Additionally, although operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the subject matter has been described in a language specific to structural features and/or methodological logic acts, it is to be understood that the subject matter defined in the appended claims is not necessarily limited to the particular features or acts described above. Conversely, the particular features and acts described above are merely example forms for implementing the claims.

What is claimed is:

1. A text processing method, applied to a real-time interactive scene or a non-real-time interactive scene, comprising:

acquiring target text information generated based on audio information;

determining a to-be-error-corrected word in the target text information and a target candidate replacement word corresponding to the to-be-error-corrected word; and determining, according to the target candidate replacement word, a target replacement word corresponding to the to-be-error-corrected word, and updating the target text information based on the target replacement word;

wherein determining, according to the target candidate replacement word, the target replacement word corresponding to the to-be-error-corrected word, and updating the target text information based on the target replacement word comprises:

for each target candidate replacement word, determining a sentence to which the to-be-error-corrected word belongs and an association feature between the each target candidate replacement word and the sentence, wherein the association feature comprises a similarity between a target candidate word and the sentence;

inputting the association feature into a pre-trained feature processing model to acquire a matching degree value between the target candidate replacement word and the sentence; and based on a matching degree value of the each target candidate replacement word, determining, from the target candidate replacement word, the target replacement word corresponding to the to-be-error-corrected word.

2. The method according to claim 1, before acquiring the target text information generated based on the audio information, further comprising:

collecting the audio information of a speaker and converting the audio information to corresponding text information; and generating, according to the text information, a speech timestamp corresponding to the speaker, and an identifier of the speaker, current text content displayed on a client, and determining the target text information based on the current text content.

3. The method according to claim 2, wherein acquiring the target text information generated based on the audio information comprises:

determining a timestamp of text content without error correction among all text content, and acquiring text content without error correction within a preset duration based on the timestamp; and determining the target text information based on the text content without error correction within the preset duration.

4. The method according to claim 3, wherein the all text content is determined based on text information displayed in a preset region of the client, or the all text content is retrieved from a speech-to-text module.

5. The method according to claim 1, wherein determining the to-be-error-corrected word in the target text information and the target candidate replacement word corresponding to the to-be-error-corrected word comprises:
 determining the to-be-error-corrected word in the target text information and the target candidate replacement word corresponding to the to-be-error-corrected word in a correction manner corresponding to a correction type, to determine the target replacement word based on the target candidate replacement word,
 wherein the error correction type comprises a type of text-pronunciation-based error correction and a type of text-content-based error correction.

6. The method according to claim 5, wherein the error correction type comprises the type of text-pronunciation-based error correction, and adopting the error correction manner corresponding to the error correction type to determine the to-be-error-corrected word in the target text information and the target candidate replacement word corresponding to the to-be-error-corrected word comprises:
 acquiring a pronunciation of each piece of text in the target text information;
 determining, according to the pronunciation of the each piece of text and hot words pre-stored in a hot word dictionary, whether a target hot word corresponding to the pronunciation of the each piece of text exists in the target text information, wherein the hot word dictionary is configured to store a plurality of hot words, and the plurality of hot words are determined based on audio information and text information that are collected in a real-time interactive process; and
 in response to the target hot word corresponding to the pronunciation of the each piece of text existing in the target text information, determining the to-be-error-corrected word in the target text information according to the target hot word, and determining the target candidate replacement word based on the to-be-error-corrected word.

7. The method according to claim 6, wherein the type of text-pronunciation-based error correction comprises a type of pinyin-based error correction.

8. A text processing method, applied to a real-time interactive scene or a non-real-time interactive scene, comprising:
 acquiring target text information generated based on audio information;
 determining a to-be-error-corrected word in the target text information and a target candidate replacement word corresponding to the to-be-error-corrected word; and
 determining, according to the target candidate replacement word, a target replacement word corresponding to the to-be-error-corrected word, and updating the target text information based on the target replacement word;
 wherein determining, according to the target candidate replacement word, the target replacement word corresponding to the to-be-error-corrected word, and updating the target text information based on the target replacement word comprises:
 acquiring a first to-be-processed sentence to which the to-be-error-corrected word belongs in the target text information, and updating the first to-be-processed sentence based on the target candidate replacement word to acquire a second to-be-processed sentence;
 determining a perplexity value of the second to-be-processed sentence;
 in response to the perplexity value being greater than or equal to a preset perplexity threshold, determining the target replacement word according to the to-be-error-corrected word; and
 in response to the perplexity value being less than the preset perplexity threshold, determining the target replacement word according to the target candidate replacement word.

9. The method according to claim 5, wherein the error correction type comprises the type of text-content-based error correction, and adopting the error correction manner corresponding to the error correction type to determine the to-be-error-corrected word in the target text information and the target candidate replacement word corresponding to the to-be-error-corrected word so as to determine the target replacement word based on the target candidate replacement word comprises at least one of:
 performing matching for text content in the target text information based on a pre-determined confusion word lexicon to determine a confusion word in the target text information, and determining the to-be-error-corrected word and the corresponding target candidate replacement word based on the confusion word; or
 determining a suspected to-be-error-corrected word in the target text information based on a pre-determined common word lexicon, and determining the to-be-error-corrected word and the corresponding target candidate replacement word based on the suspected to-be-error-corrected word.

10. The method according to claim 9, wherein performing the matching for the text content in the target text information based on the pre-determined confusion word lexicon to determine the confusion word in the target text information, and determining the to-be-error-corrected word and the corresponding target candidate replacement word based on the confusion word comprises:
 determining the confusion word in the target text information based on the pre-determined confusion word lexicon, and taking a word in the pre-determined confusion word lexicon corresponding to the confusion word as the target candidate replacement word.

11. The method according to claim 9, before determining the suspected to-be-error-corrected word in the target text information based on the pre-determined common word lexicon, and determining the to-be-error-corrected word and the corresponding target candidate replacement word based on the suspected to-be-error-corrected word, further comprising:
 segmenting a sentence in the target text information to acquire at least one key word to determine the to-be-error-corrected word from the at least one key word.

12. The method according to claim 11, wherein determining the to-be-error-corrected word in the target text information and the target candidate replacement word corresponding to the to-be-error-corrected word comprises:
 determining, based on the pre-determined common word lexicon, a key word not comprised in the pre-determined common word lexicon, and determining a suspected to-be-error-corrected word set based on the key word not comprised in the pre-determined common word lexicon, wherein the suspected to-be-error-corrected word set comprises at least one suspected to-be-error-corrected word;
 acquiring the to-be-error-corrected word by verifying the at least one suspected to-be-error-corrected word, and determining, based on the to-be-error-corrected word, at least one replacement word corresponding to the to-be-error-corrected word; and determining at least one target candidate replacement word based on the at least one replacement word to determine the target replacement word based on the at least one target candidate replacement word.

13. The method according to claim 12, wherein acquiring the to-be-error-corrected word by verifying the at least one suspected to-be-error-corrected word comprises:

for each suspected to-be-error-corrected word of the at least one suspected to-be-error-corrected word, determining a current position of the each suspected to-be-error-corrected word in the target text information;

acquiring, based on the current position, text with a preset number of characters before and after the current position, and combining the text with the suspected to-be-error-corrected word to acquire at least one combined word;

in response to no word corresponding to a combined word being matched from the pre-determined common word lexicon, generating a candidate suspected to-be-error-corrected word based on the each suspected to-be-error-corrected word corresponding to the combined word matching no corresponding word, wherein the combined word belongs to the at least one combined word; and determining feature information of each candidate suspected to-be-error-corrected word in a sentence to which the each candidate suspected to-be-error-corrected word belongs, and determining at least one to-be-error-corrected word according to the feature information.

14. The method according to claim 13, further comprising:

in response to a word corresponding to a combined word being matched from the pre-determined common word lexicon, removing, from the suspected to-be-error-corrected word set, a suspected to-be-error-corrected word corresponding to the combined word matching the corresponding word, wherein the combined word belongs to the at least one combined word.

15. The method according to claim 13, wherein determining the feature information of the each candidate suspected to-be-error-corrected word in the sentence to which the each candidate suspected to-be-error-corrected word belongs, and determining the at least one to-be-error-corrected word according to the feature information comprises:

for each candidate suspected to-be-error-corrected word, determining, based on a text feature extraction model, the feature information of the each candidate suspected to-be-error-corrected word in a sentence to which the each candidate suspected to-be-error-corrected word belongs;

inputting the feature information into a pre-trained branch model to acquire an assessment value corresponding to the feature information;

in response to the assessment value being greater than or equal to a preset assessment threshold, taking the each candidate suspected to-be-error-corrected word as a common word, and removing the each candidate suspected to-be-error-corrected word from the suspected to-be-error-corrected word set; and wherein the branch model is configured to determine a matching degree between the input feature information and feature information of a sentence.

16. The method according to claim 15, further comprising:

in response to the assessment value being less than the preset assessment threshold, generating the to-be-error-corrected word based on the candidate suspected to-be-error-corrected word.

17. The method according to claim 12, wherein determining, based on the to-be-error-corrected word, the at least one replacement word corresponding to the to-be-error-corrected word comprises:

for each to-be-error-corrected word, determining the at least one replacement word corresponding to the each to-be-error-corrected word according to an editing distance between the each to-be-error-corrected word and another word, a number of maximum common character strings, and a usage frequency of a word;

wherein determining the at least one target candidate replacement word based on the at least one replacement word comprises:

for each replacement word corresponding to the to-be-error-corrected word, acquiring a sentence to which the to-be-error-corrected word belongs;

determining a similarity value between the each replacement word and the sentence, and determining a perplexity value of the sentence after the to-be-error-corrected word is replaced based on the each replacement word; and determining, based on a perplexity value of the each replacement word and a similarity value of the each replacement word, that a preset number of replacement words serve as the at least one target candidate replacement word.

18. An electronic device, applied to a real-time interactive scene or a non-real-time interactive scene, comprising:

at least one processor; and a storage apparatus configured to store at least one program, wherein when executed by the at least one processor, the at least one program causes the at least one processor to perform the following operations:

acquiring target text information generated based on audio information;

determining a to-be-error-corrected word in the target text information and a target candidate replacement word corresponding to the to-be-error-corrected word; and determining, according to the target candidate replacement word, a target replacement word corresponding to the to-be-error-corrected word, and updating the target text information based on the target replacement word;

wherein determining, according to the target candidate replacement word, the target replacement word corresponding to the to-be-error-corrected word, and updating the target text information based on the target replacement word comprises:

for each target candidate replacement word, determining a sentence to which the to-be-error-corrected word belongs and an association feature between the each target candidate replacement word and the sentence, wherein the association feature comprises a similarity between a target candidate word and the sentence;

inputting the association feature into a pre-trained feature processing model to acquire a matching degree value between the target candidate replacement word and the sentence; and based on a matching degree value of the each target candidate replacement word, determining, from the target candidate replacement word, the target replacement word corresponding to the to-be-error-corrected word.

19. A non-transitory storage medium comprising computer-executable instructions, applied to a real-time interactive scene or a non-real-time interactive scene, wherein when the computer-executable instructions are executed by a computer processor, the text processing method according to claim 1 is performed.

* * * * *